United States Patent [19]
Dock et al.

[11] 4,182,189
[45] Jan. 8, 1980

[54] METHOD AND MEANS FOR ATTAINING A PREDETERMINED COMPRESSIVE STRESS

[75] Inventors: Carl G. Dock; Nils G. Schrewelius, both of Hallstahammar, Sweden

[73] Assignee: Bulten-Kanthal AB, Hallstahammer, Sweden

[21] Appl. No.: 886,553

[22] Filed: Mar. 14, 1978

[30] Foreign Application Priority Data

Mar. 15, 1977 [SE] Sweden .......................... 7702888
Mar. 30, 1977 [SE] Sweden .......................... 7703690

[51] Int. Cl.² .......................................... G01D 21/00
[52] U.S. Cl. .............................. 73/761; 116/DIG. 34; 85/DIG. 1
[58] Field of Search ............... 73/88 F, 88 E, 761, 73/141 R; 116/DIG. 34; 85/DIG. 1, 62; 102/204, 205

[56] References Cited
U.S. PATENT DOCUMENTS

| 2,960,902 | 11/1960 | De Caro | 85/DIG. 1 |
|---|---|---|---|
| 3,170,365 | 2/1965 | Vaughn | 85/DIG. 1 |
| 3,435,724 | 4/1969 | Trungold | 85/62 |
| 3,889,526 | 6/1975 | Elsner et al. | 73/761 |
| 3,964,229 | 6/1976 | Fischer | 56/698 |
| 3,974,685 | 8/1976 | Walker | 173/12 |

FOREIGN PATENT DOCUMENTS 377209 7/1932 United Kingdom .
1275852 5/1972 United Kingdom .
1442292 7/1974 United Kingdom .

Primary Examiner—Anthony V. Ciarlante
Attorney, Agent, or Firm—Hill, Van Santen, Steadman, Chiara & Simpson

[57] ABSTRACT

A method for attaining a predetermined compressive stress is achieved by a device in the form of a washer, coating, or plug which as a function of pressure does not yield significantly, but when a predetermined pressure is reached, a sudden change in structure takes place which effects detonation of an explosive mixture which detonation is indicated by a sound, a puff of smoke, a change of appearance, a sudden release of heat, or an instantaneous increase in friction. The device includes a porous brittle body in which an explosive substance has been absorbed, and also preferably hard particles that aid in effecting detonation when the porous body goes through a physical change. The detonation can also join contact surfaces together, serve as an indication of desired prestress or torque applied to a fastener, to indicate a load limit, and the like.

23 Claims, 11 Drawing Figures

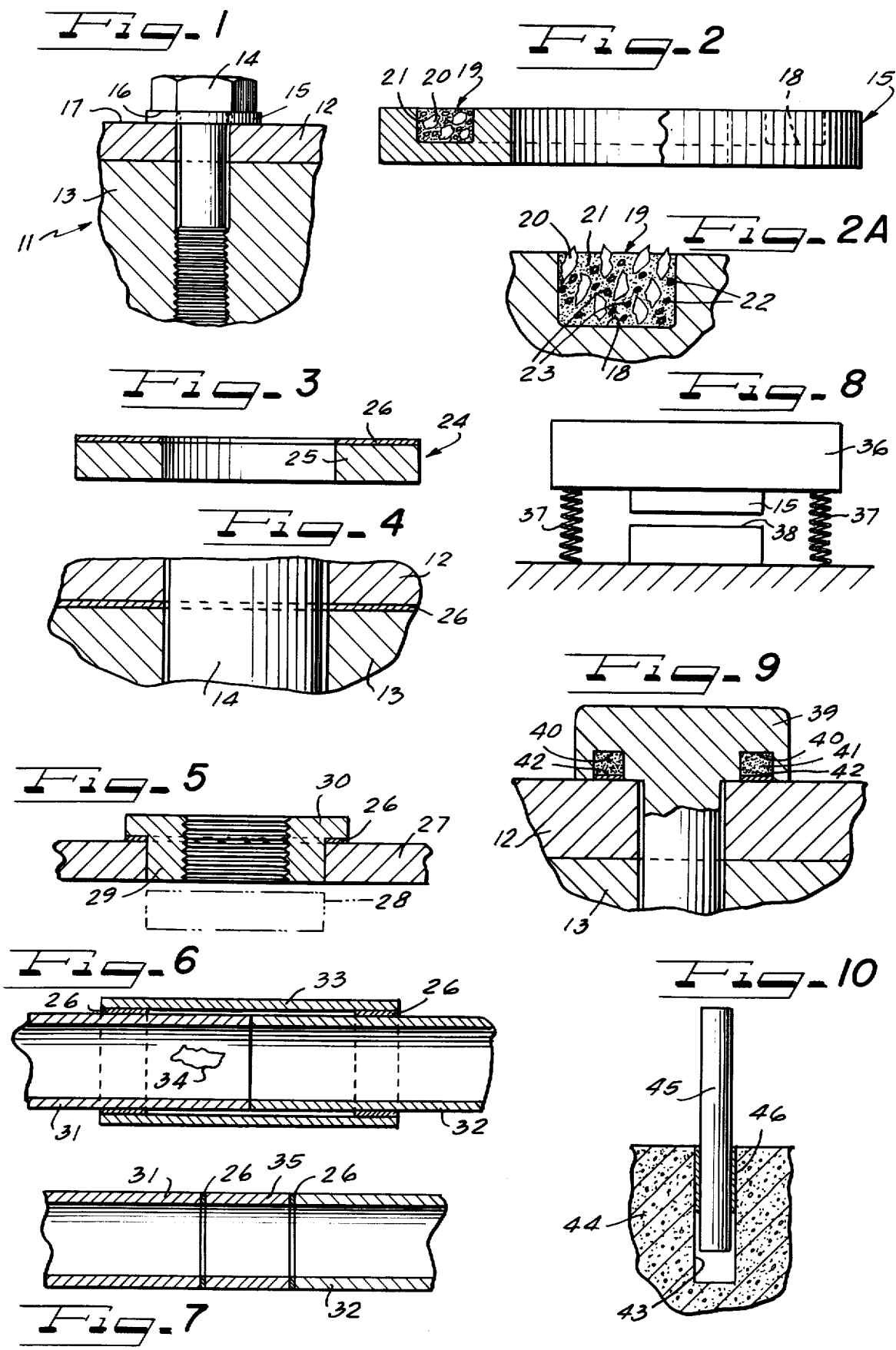

METHOD AND MEANS FOR ATTAINING A PREDETERMINED COMPRESSIVE STRESS

BACKGROUND OF THE INVENTION

1. Field of the Invention

This invention pertains to a method of attaining a compressive stress of predetermined magnitude between a pair of contact surfaces including a device for doing so.

2. Prior Art

There are numerous examples where it has been desirable to know when a predetermined compressive stress has been attained in an assembly, for instance where a nut or bolt is used to hold an assembly together, or when a predetermined load is applied to a vehicle or lifting device. In the past, torque wrenches have been used to effect tightening, and it has been presumed that the torque would be a direct indication of the stress in the bolt. Such measurements are subject to considerable variation because the friction can vary due to surface finish, material hardness, and lubrication. Tightening tools of varying quality also produce a difference in results.

Various washers have been proposed to be used in a fastening device under a bolt head or nut to indicate a predetermined compression and hence tightness of the fastening device. These include a washer which changes color as a function of pressure, a laminated pad that transfers ink to successive layers as a function of pressure, a washer assembly which expands radially a predetermined amount as a function of pressure until a calibrated limit is indicated automatically, and a washer that has a compressible portion which on being compressed a given amount causes an inrease in torque needed to continue tightening, such increase being sensed.

SUMMARY OF THE INVENTION

The present invention is directed to a method for attaining a predetermined compressive stress and the means for doing so. A device in the form of a washer, coating or plug does not yield significantly as a function of pressure until a predetermined force is reached, and at that moment, there is a sudden physical change in structure which effects detonation of an explosive. The detonation is indicated by a sound, a puff of smoke, a change of appearance, a sudden release of heat, or an instantaneous increase in friction. The device includes a porous body which typically is brittle and into which an explosive substance has been absorbed. A fracture of the body effects detonation, and the detonation can be aided by hard particles normally held in fixed relation by the porous body.

Accordingly, it is an object of the present invention to provide a method of attaining a compressive stress of predetermined magnitude between a pair of contact surfaces.

A further object of the present invention is to provide a device responsive to an attained compressive stress of predetermined magnitude between a pair of contact surfaces.

A still further object of the present invention is to provide a number of applications for the use of such method and device.

Many other advantages, features and additional objects of the present invention will become manifest to those versed in the art upon making reference to the detailed description and the accompanying sheet of drawings in which preferred structural embodiments incorporating the principles of the present invention are shown by way of illustrative example.

ON THE DRAWINGS

FIG. 1 is a cross-sectional view of a screw joint provided in accordance with the present invention;

FIG. 2 is an enlarged cross-sectional view of a portion of FIG. 1, the same being diagrammatic in nature;

FIG. 2A is a further-enlarged view showing a portion of FIG. 2 embodying a variation thereof;

FIG. 3 is a diagrammatic cross-section of a modification of FIG. 2;

FIG. 4 is a fragmentary diagrammatic modification of FIG. 1;

FIGS. 5–10 show further applications and/or modifications of the invention.

AS SHOWN ON THE DRAWINGS

The principles of the present invention are particularly useful when embodied in a screw joint as shown in FIG. 1, generally indicated by the numeral 11. An apertured plate 12 is secured to a block 13 by means of a conventional bolt 14. Beneath the head of the bolt 14 is a device 15 in the form of a washer which is responsive to an attained compressive stress of predetermined magnitude, and in this use of the invention, the device 15 directly engages the lower side of the head of the bolt 14 and such side is here referred to as a contact surface 16. The opposite side of the device 15 engages the upper side of the plate 12, which is here referred to as a contact surface 17.

The device 15 has been hollowed out to provide an annular channel 18 in which there is disposed a porous body 19. The porous body 19 is hard and brittle and may comprise a resin or a polymer. The porous body 19 serves as a bonding agent for a number of relatively hard particles 20, such as silicon carbide. Although it is difficult to illustrate, the various pores of the body 19 are interconnected and are filled with an explosive material 21 which has been absorbed therein. As better shown in FIG. 2A, in some instances, it is preferable to have one or more of the hard particles 20 projecting from the outer surface of the body 19 so the same will directly engage the contact surface 16 for a purpose described below. The brittle porous body 19 may also serve as a bonding agent for a further type of interspersed particle 22 which is selected to give off a puff of smoke when the explosive substance 21 is detonated. The brittle porous body 19 may also function as a bonding agent to hold a further type of particle 23 which is selected to alter the appearance, such as the color, of the device 15 in response to detonation so that on subsequent visual inspection, it can be determined whether the device has been detonated. The hard particles 20 are not of uniform size, but preferably they are primarily in the size range of about 0.25 to 2.00 milimeters, neither limit being critical per se. There is a special case of particle size described later herein.

Fracture of the porous body 19 causes detonation. Therefore, the porous body 19 together with its explosive substance absorbed therein along with such of the particles 20, 22 and 23 that may be included, are referred to herein collectively as a pressure-sensitive explosive mixture.

In FIG. 1, the pressure-sensitive explosive mixture has been disposed in the device 15 which has been placed between the contact surfaces 16, 17. On tightening of the bolt 14, the portions of the washer-like device 15 that are not cut away are placed in compression, and as such compression progresses, the pressure-sensitive explosive mixture is also compressed until the brittle body 19 fractures. When this happens, the explosive substance becomes jarred and detonates. Detonation is aided by a relative shift between various hard particles 20 or portions thereof. The detonation thus indicates that the predetermined magnitude of compressive stress has been reached, and this is signaled by the sound of detonation, the smoke from the particles 22, the effect on appearance of the particles 23, and usually a change in the amount of torque required for further tightening. When one of the indications of detonation has been sensed, then the application of further force is terminated. The washer-like portion of the device 15 is in effect a carrier, and the configuration of this carrier, even through detonation has taken place, maintains the spacing between the contact surfaces 16, 17 and thus maintains the desired pre-tension on the bolt 14.

In some applications, such a high level of pretension will not be necessary, and in such instance, it could be desired to detonate the device immediately. When it is desired to do so, one or more of the hard particles 20 can be disposed as described above with reference to FIG. 2A. Thus with this arrangement, the contact surfaces would act rather promptly if not instantaneously on the device.

FIG. 3 shows a modified form of the device 15, generally indicated at 24. The device 24 includes a conventional washer 25 to which there has been provided a strip or coating 26 which also comprises a porous body in which an explosive substance has been absorbed and which preferably includes one or more of the types of particles 20, 22, 23 described above. The washer 25 thus also comprises a carrier for the pressure-sensitive explosive mixture 26. When the mixture is in strip or coating form, it is preferred that the majority of the particles 20 have a mean diameter that corresponds to the thickness of the strip or coating 26, so that after detonation, those hard particles will continue to function as a spacer with smaller particles functioning as a filling material between the larger particles 20.

With the proper amount of explosive substance, and with the strip or coating 26 formed to be very thin, a welding action can take place between the washer 25 and the contact surface 16. If the device 24 were inverted and then installed in FIG. 1, the weld would take place with the contact surface 17 to thus provide a raised boss thereon.

FIG. 4 illustrates the strip or coating 26 inserted between the plate 12 and the block 13. With this arrangement, a weld would be provided by the detonation between the plate and the block.

FIGS. 5-10 illustrate other applications for using the strip or coating 26 or the form of explosive mixture shown in FIG. 2.

FIG. 5 shows a plate 27 from which a slug 28 has been punched by a shouldered punch-nut 29, there being the strip or coating 26 inserted between the lower side of the shoulder 30 of the nut 29 and the upper side of the plate 27, which comprise the contact surfaces. On detonation, the shoulder 30 becomes welded to the plate 27.

FIG. 6 shows a tube 31, a second tube 32 and a sleeve 33. The tube 31 has a leak or defect 34. The coating 26 has been applied to the interior ends of the sleeve 33 which thus functions as a carrier. On detonation, a pair of circular welds are provided between the sleeve 33 and the tubes 31,32, thus enclosing the defect 34 and/or joining the two tubes together.

FIG. 7 shows a further way in which the tubes 31,32 may be joined together. In this view, a somewhat shorter sleeve 35 has end surfaces to which the strip or coating 26 is applied. The tubes 31,32 may be squeezed together to effect the detonation, and if desired, one of them could be given an axial blow by a hammer to effect a similar result, a procedure which may also be used with the structure of FIG. 6.

FIG. 8 is a diagrammatic representation illustrating how the device 15 may be utilized to indicate that a predetermined weight or load has been loaded onto a vehicle or achieved by a lifting device, both represented by the numeral 36. Ordinary stresses of load or weight are readily carried, for instance by a number of springs 37, but if the predetermined limit is exceeded, the device 15 will detonate when it comes in contact with a second contact surface 38.

FIG. 9 corresponds to FIG. 1 except that the detonating device is carried directly by a modified head 39 of the bolt, instead of in a separate carrier. The head 39 has at least one blind hole drilled into it from its lower side, or as shown, a pair of oppositely disposed holes 40,40 the blind ends of which comprise a contact surface. If desired, the holes 40,40 could comprise an annular channel as described for FIG. 2. Each of the holes 40 is provided with a body 41 corresponding to the body 19 and containing a similar selection of particles. The second contact surface 42 is provided by a close fitting plug which transmits force to the body 41 by reacting against the upper surface of the plate 12. If the thickness of the plug 42 is sufficiently thin, detonation will cause it to become welded to the upper surface of the plate 12 to prevent further tightening or any loosening of the bolt.

FIG. 10 illustrates the use of the invention where a hole 43 has been provided in concrete 44 and into which a fastener of any type, with or without a head, has been inserted. The space between the fastener 45 and the concrete 44 is filled with a coating 46, generally corresponding to the coating 26 of FIG. 6, and is then mechanically or electrically detonated. The detonation affects the adjacent surface of the fastener 45 so that a tight permanent connection is established.

The combination of welding and of screw-tightening is thus illustrated in at least FIGS. 4 and 9.

Where the device 15 is used in the manner illustrated in FIG. 8, it may be in the form of a disc rather than in the form of a washer.

If the strip or coating 26 is applied directly to the lower side of the head 39 of FIG. 9 or to the head of the bolt 14 in FIG. 1, detonation will effect a permanent joint between the screw head and the contact surface which it acts against, thereby preventing screw movement in either direction.

There is no particular explosive substance which is essential for the practice of this invention. However, it should preferably have a detonation speed in the range of 2,000 to 8,000 meters per second. Examples of such substances are diazophenolate and cyclotrimethylenetrinitramine.

It is emphasized that the drawings are diagrammatic in nature and that they are not drawn to scale. For instance, the coating or strip 26 is greatly enlarged to facilitate illustration.

Although various minor modifications might be suggested by those versed in the art, it should be understood that we wish to embody within the scope of the patent warranted hereon, all such embodiments as reasonably and properly come within the scope of our contribution to the art.

We claim as our invention:

1. A method for determining when a compressive stress of predetermined magnitude between a pair of contact surfaces, has been obtained comprising:
   (a) applying a selected quantity of pressure sensitive explosive mixture between the contact surfaces, said explosive mixture comprising an explosive substance absorbed into a porous brittle body; and
   (b) forcing said contact surfaces toward each other until said stress is reached, causing said mixture to change physically, whereby the mixture detonates and releases its intrinsic energy, thereby indicating that said predetermined stress has been attained.

2. A method according to claim 1, including using the released intrinsic energy to weld the contact surfaces together.

3. A method according to claim 1, including terminating the application of further force in response to the sound of the detonation.

4. A method according to claim 1, including terminating the application of further force in response to smoke of the detonation.

5. A method according to claim 1, in which the explosive mixture is applied to a carrier, and disposing the carrier between said contact surfaces.

6. A method according to claim 5, including using said carrier to maintain the spacing between said contact surfaces after detonation.

7. A method according to claim 5, including using a change in appearance of said carrier to indicate that detonation has taken place.

8. A method according to claim 1, including using the detonation to indicate that a predetermined load has been reached in a system from which the energy is obtained which effects said forcing.

9. A device responsive to an attained compressive stress of predetermined magnitude between a pair of contact surfaces, comprising:
   (a) a porous body adapted to be disposed between said contact surfaces to have a compressive force applied thereto, said body being brittle and hence subject to physical change in response to said predetermined magnitude of stress; and
   (b) an explosive substance disposed in and distributed among the pores of said body, and detonatable in response to such change of said body.

10. A device according to claim 9, including particles in said porous body which are harder than the material of the porous body, said particles being movable in relation to each other in response to said physical change of the body to effect the detonation of said substance.

11. A device according to claim 10, at least one of said particles protruding from said porous body to directly engage one of the contact surfaces.

12. A device according to claim 10, said particles being primarily and substantially in the size range of 0.25 to 2.00 millimeters.

13. A device according to claim 10, said porous body comprising a brittle bonding agent holding said particles in a fixed relative position with respect to each other, some of such relative positions being changed in response to breakage of said brittle bonding agent.

14. A device according to claim 10, including further particles in said body responsive to the detonation to give off a puff of smoke.

15. A device according to claim 10, including further particles in said body responsive to the detonation to change the appearance of said body.

16. A device according to claim 10, in which said particles are silicon carbide.

17. A device according to claim 9, including a pair of contact surfaces between which said body is disposed, and means for urging said contact surfaces together.

18. A device according to claim 17, including a carrier supporting said porous body.

19. A device according to claim 18, in which said carrier has the form of a washer.

20. A device according to claim 18, in which said carrier is in strip form.

21. A device according to claim 17, in which said porous body has the form of a coating.

22. A device according to claim 17, in which said porous body is secured to a fastener.

23. A device according to claim 9, said porous body comprising one of a brittle resin and a brittle polymer.

* * * * *